United States Patent [19]

Van Dillen

[11] 4,160,489
[45] Jul. 10, 1979

[54] THROTTLE CONTROL DEVICE

[76] Inventor: Albert Van Dillen, Kroonprins 21, Haaksbergen, Netherlands

[21] Appl. No.: 836,798

[22] Filed: Sep. 26, 1977

[51] Int. Cl.² .............................................. B60K 31/00
[52] U.S. Cl. ..................................... 180/282; 137/45; 180/170; 192/3 T
[58] Field of Search ........... 180/103 R, 103 A, 105 R, 180/107, 109, 104; 137/45, 47, 48, 51; 74/513, 527; 192/3 T; 123/105 R, 110

[56] References Cited

U.S. PATENT DOCUMENTS

| | | | |
|---|---|---|---|
| 2,016,864 | 10/1935 | Lange | 180/104 X |
| 2,450,113 | 9/1948 | Burchett | 137/45 X |

*Primary Examiner*—David M. Mitchell
*Assistant Examiner*—Michael Mar
*Attorney, Agent, or Firm*—John P. Snyder

[57] ABSTRACT

A vehicle cruise control device in the form of a Bowden cable connection to the engine throttle so as to be movable therewith as the operator controls the accelerator pedal, and a locking device selectively movable to various predetermined positions at which it can capture the cable connection and prevent the throttle from returning to closed position while still allowing normal opening of the throttle. The cruise speed is adjusted by selecting the predetermined position at which the locking device captures the cable connection. An inertial mass responds to braking or deceleration force on the vehicle to release the cable connection from its captured condition.

15 Claims, 9 Drawing Figures

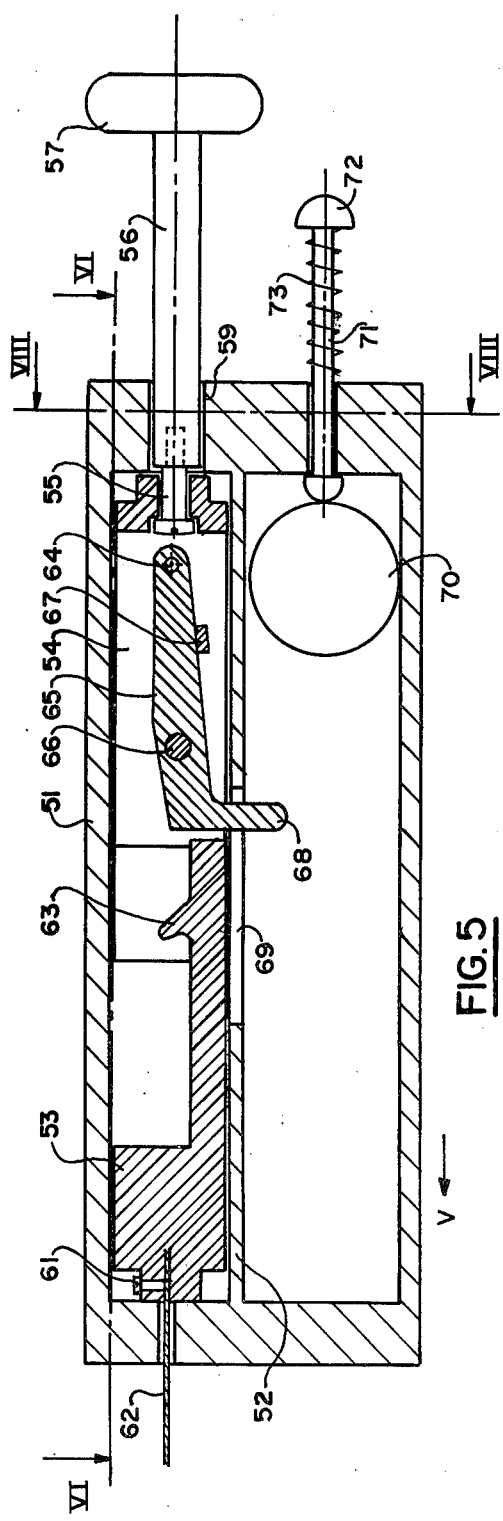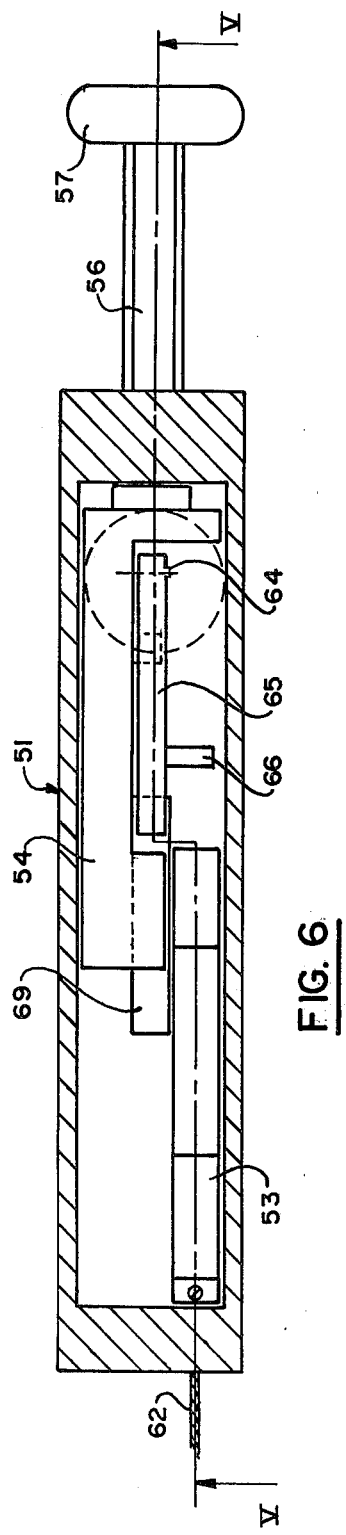

4,160,489

THROTTLE CONTROL DEVICE

BACKGROUND OF THE INVENTION

This invention relates to a device which can be operated from the instrument panel of a motor vehicle for achieving a so-called "cruise control".

Such devices are known as, for example, in Dutch patent 104601 wherein a lever system is connected with a disc which is mounted rotatably and slidably on a shaft so that it can be pressed frictionally against a disc which is fixedly mounted on the shaft. The two discs are normally urged apart under the action of a spring interposed between them and shifting of the shiftable or slidable disc is effected by a wedge bar which engages, on one side a first ball bearing which is fixed to the shaft and on its opposite side with a second ball bearing which is slidably mounted on the shaft and thus causes movement of the slidable disc. This device forms a fairly complicated construction and requires a considerably long stroke of the operating element or wedge bar in order to obtain sufficient operating force as will press the two discs together sufficiently firmly whereby no mutual rotation can occur even when the parts become dirty or greasy. A further constructional disadvantage resides in the fact that the lever system which is connected to the throttle of the vehicle engine lies in or adjacent the plane of the slidable disc and thus is displaced at one end thereof in a plane perpendicular to its plane when the slidable disc is likewise shifted.

BRIEF SUMMARY OF THE INVENTION

The present invention incorporates a holding member and a locking member which are normally disposed in spaced relationship, the locking member being disposed in selected fixed position. The holding member is connected to the throttle control of a vehicle engine and moves in concert therewith so that as the throttle plate of the engine is moved from a closed to open position, the holding member moves toward and into operative association with the fixed locking member. When this operative position is reached, the locking member captures the holding member and although it will allow further opening movement of the throttle plate, it prevents return motion of the throttle plate beyond a predetermined partially open position, thereby establishing a "cruise control" for the engine.

The present invention involves a system wherein no restraint is placed upon the throttle mechanism for movement in the throttle opening direction, but wherein restraint is placed upon the throttle mechanism against returning towards the closed condition beyond some preselected position at which the locking means captures the holding means which participates in the movement of the throttle so as to move in concert therewith. Inertia means serves to remove this restraint when a predetermined deceleration or braking force is exerted on the associated vehicle.

BRIEF DESCRIPTION OF THE DRAWING FIGURES

FIG. 5 is a vertical section taken through another embodiment of the invention as indicated by section line 5—5 in FIG. 6;

FIG. 6 is a horizontal section taken generally along the plane of section line 6—6 in FIG. 5;

DETAILED DESCRIPTION OF THE INVENTION

Figure 1:
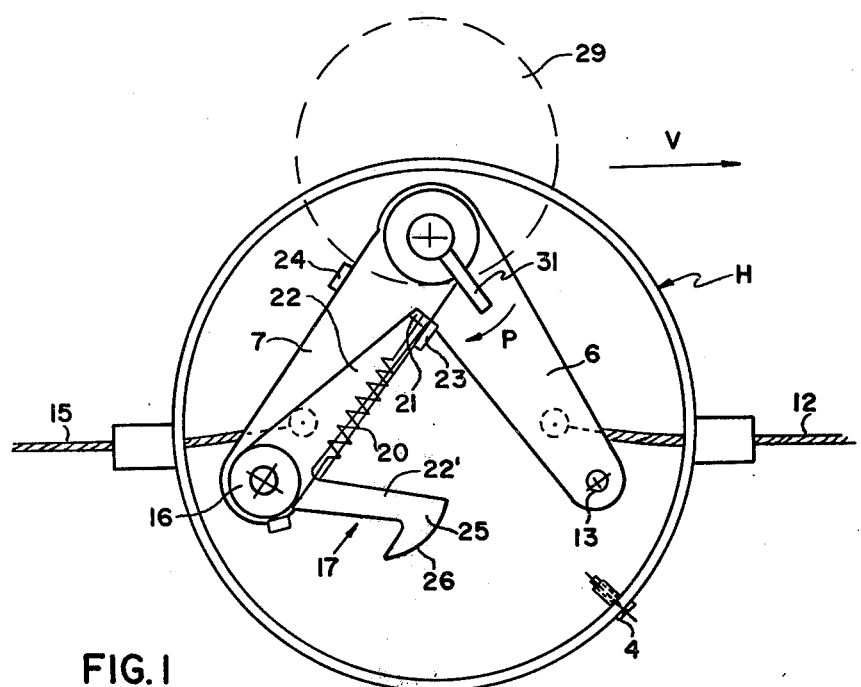
FIG. 1 is a plan view illustrating the details of one embodiment of the invention.

Referring at this time more particularly to the embodiment illustrated in FIGS. 1-4 of the drawings, the reference character H indicates generally the housing within which the component parts of this embodiment are disposed. As will hereinafter appear, the housing H is disposed horizontally such that its bottom wall 1 is lowermost and the cylindrical side wall 2 of which is vertically disposed.

The housing is provided with a transparent cover 3 secured removably in place by suitable screws. The bottom 1 of the housing is provided with an upstanding boss portion 5 which is of reduced diameter at its upper end U thereby to provide the step H as shown best in FIG. 4.

Figure 2:
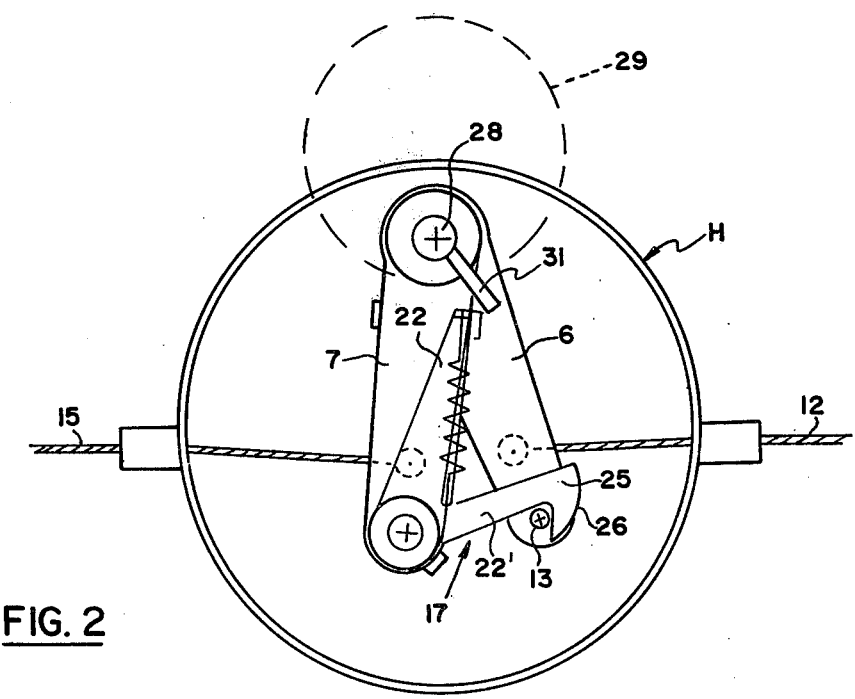
FIG. 2 is a view similar to FIG. 1 but illustrating the component parts in throttle-restraining position.
Figure 3:
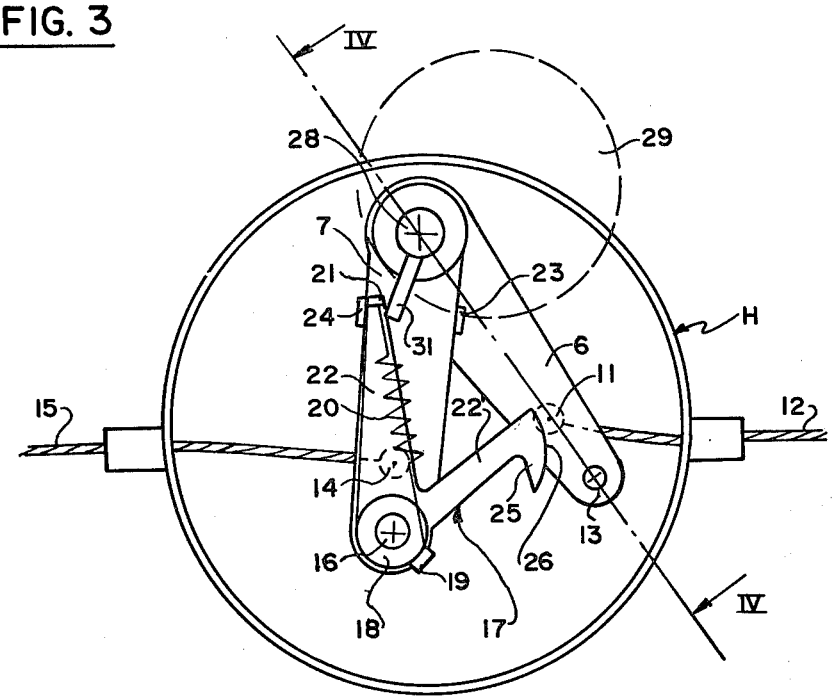
FIG. 3 is a view similar to FIGS. 1 and 2 but illustrating the disposition of component parts during a releasing action.

A holding member 6 in the form of an arm is freely pivoted at one end thereof on the boss portion U and extends radially therefrom as is illustrated in FIGS. 1-3 so as to be free to swing back and forth along a predetermined path within the confines of the housing H. The holding member 6 is provided at its free end with an upstanding pin 13 and intermediate its ends it is provided with a cable connector member 11 through which the cable 12 may be threaded and secured. The side wall 2 of the housing is provided with an opening through which the cable passes and the opposite end of the cable 12 is secured to the throttle plate lever or other operating linkage for the throttle of the associated vehicle such that the holding member 6 is constrained to swing back and forth along the path in concert with opening and closing movements of the throttle plate. The connection is such that when the throttle plate is in the fully closed position, the arm or holding member 6 is disposed in the position illustrated in FIG. 1.

Figure 4:
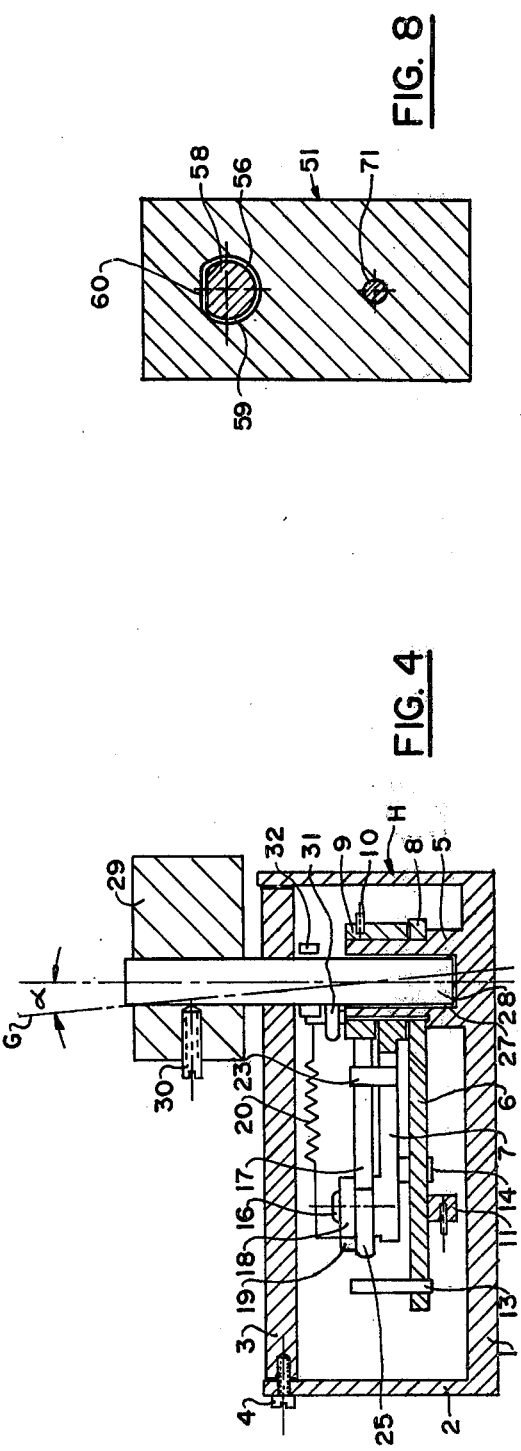
FIG. 4 is a vertical section taken generally along the plane of section 4—4 in FIG. 3 and illustrating certain details of the components.

A further arm or locking member 7 is also pivotably mounted on the portion U of the boss 5 immediately above the arm 6 as can best be seen in FIG. 4 so as to extend radially as illustrated in FIGS. 1-3.

The free end of this arm 7 carries an upstanding pivot pin 16 upon which is pivotally mounted the capturing means indicated generally by the reference character 17. The capturing means 17 presents two rigid leg portions 22 and 22' disposed in generally V-shaped configuration with the leg 22 overlying the arm 7 and restricted in movement relative thereto about the pivot pin 16 by means of the two stops 23 and 24 which are fixed to and extend upwardly from opposite sides of the arm 7, as illustrated.

The latching means 17 is retained on the pivot pin 16 by means of the retaining washer 18 which carries a set screw 19 for rigidly affixing the collar or washer 18 to the pivot pin 16. The set screw 19 also serves as anchoring means for one end of a tension spring 20, the opposite end of which is anchored to the upstanding end 21 formed on the free end of the leg 22. By this construction, the latching means 17 is normally urged under the action of the spring 20 such that the leg 22 engages the stop 23, as is illustrated in FIGS. 1 and 2.

Another Bowden cable 18 projects through the side wall 2 of the housing H and is secured to the connector 14 fixed to the underside of the arm 7. In FIGS. 1-3, it is to be understood that the cable portions 12 and 15 are the inner cores or movable cable portion of a conventional Bowden cable construction, the outer sheath of which is not illustrated in these Figures.

The cable 18 extends to a suitable control device located, for example, on the dashboard of an associated vehicle whereby the arm 7 may be disposed in different positions as illustrated for example in FIGS. 1 and 3 under control of the operator. The operating mechanism for the cable 15 may take, for example, the form of a control conventionally employed for hand chokes or hand throttle and may specifically include such a mechanism wherein rotation of the control knob effects locking of the same in a desired position. In any event, the operation of the device thus far described will be explained. The operator selects the position for the arm 7 as, for example, is shown in FIG. 2 and, initially, the arm 6 will be in the position shown in FIG. 1 with the throttle plate of the vehicle in the closed position. With the disposition of the arm 7 as shown in FIG. 2, as soon as the operator of the vehicle has manipulated the accelerator pedal such that the throttle plate assumes a position as shown in FIG. 2, the pin 13, as the throttle is moved to this position will first encounter the arcuate or cam side 26 of the hook-shaped latch 25 formed at the free end of the leg 22'. The latching means 17 will thus be cammed aside against the action of the tension spring 20 until the pin passes the hook end, whereafter the spring 20 will cause the leg 22 to swing back against the stop 23 so that the hook 25 thereby captures the pin 13. Although continued opening movement of the throttle is permitted, the throttle plate cannot return to the fully closed position but is arrested or retained in some intermediate position as established by the position of the arm 7, as is illustrated in FIG. 2, thereby to establish a "cruise control" setting of the throttle plate.

Provision is made automatically to release the pin 13 and thereby the arm 6 from its capture by the latching device 17 automatically upon attainment of a predetermined deceleration or retarding force exerted on the vehicle as for example when the brakes are applied. For this purpose, an inertia means indicated generally by the reference character I is employed. The inertia means takes the form of a shaft 28 which is received in the bore 27 of the boss 5 as is illustrated in FIG. 4. It is to be noted that the housing assembly H is so positioned that it attains the disposition relative to the direction of movement of the vehicle as indicated by the arrow V in FIG. 1 and that the axis of the shaft 28 is slightly tilted relatively to the vertical line G as indicated by the angle $\alpha$ in FIG. 4 the tilt being in a direction about perpendicular to the direction of movement V. Thus, with the housing H disposed horizontally and oriented relative to the direction V as illustrated in FIG. 1, the eccentric weight 29 which is fixed to the shaft 28 by means of the set screw 30 will assume normally under the action of gravity a position as is indicated by the dashed line in FIG. 1. The shaft 28 carries a pin 31 which is oriented relative to the eccentricity of the weight 29 substantially as is shown in FIG. 1 so that, upon the effect of a deceleration or braking force exerted on the vehicle, the eccentric weight 29 will swing to the position illustrated in FIG. 3, thereby carrying with it the pin 31 which, in the process, abuts against the upstanding portion 21 on the leg 22 to swing the leg 22 from its normal position abutting the stop 23 to the retracted or swung aside position wherein it engages the stop 24. In the process, the hook 25 will be swung aside to release the pin 13 and thereby allow the throttle plate of the vehicle to return under the normal return spring action to the fully closed or idle position. It will be appreciated that the force of deceleration as effected for example by braking which is required to effect the swinging aside of the latching member 17 is predominantly controlled by the tension of the spring 20 and this may be adjusted by the rotational position of the collar 18 on the shaft 16.

In order to retain the arms 7 and 6 properly in position on the upper portion U of the boss 5, a retaining collar 9 is provided, secured to such portion of the boss by means of a suitable set screw 10 as is best illustrated in FIG. 4 of the drawing.

Figure 7:
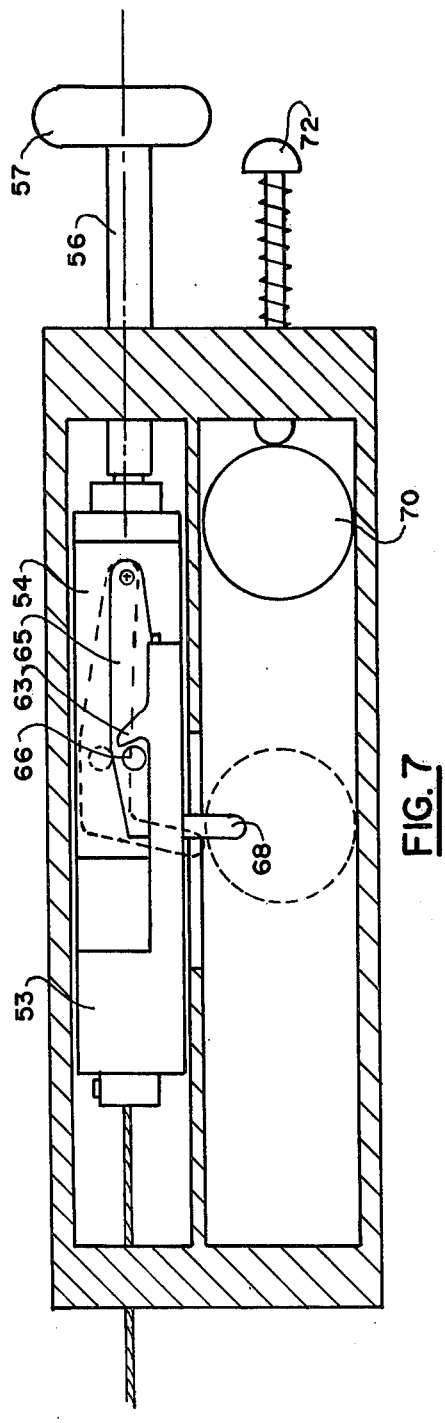
FIG. 7 is a view similar to FIG. 5 but illustrating the operation of the inertia means.
Figure 8:
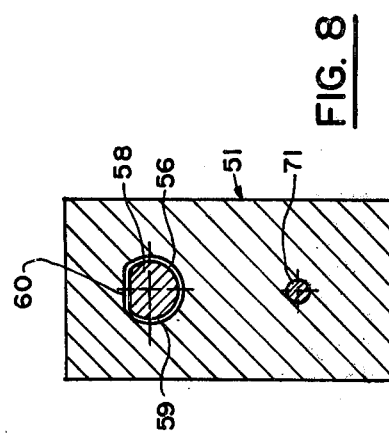
FIG. 8 is a transverse section taken generally the plane of section line 8—8 in FIG. 5.

In the modification of the invention illustrated in FIGS. 5-8, the entire assembly is adapted to be mounted on a dashboard of the vehicle within easy reach of the driver or operator. In this instance, an elongate housing 51 is provided with an internal horizontal partition 52 which serves as a guide for the members 53 and 54 which correspond respectively to the arms 6 and 7 of FIGS. 1-4. The member 53 is provided with a recess or bore receiving one end of the cable 62 which is attached to the throttle control mechanism and is also provided with a suitable set screw 61 for fixing the cable to the member 53 as illustrated. The members 53 and 54 are always in slightly overlapping relationship as will be clear from FIG. 6 so as to allow unrestrained sliding movement of the member 53 towards the right-hand end of the housing to a position which corresponds to the fully open condition of the throttle plate. Likewise, the member 54 is free to be moved to fixed positions within the housing in a direction toward the left in FIG. 6. For this purpose, the member 54 is secured to the shaft 56 by means of a suitable fastener 55, the shaft projecting through one end of the housing 51 and being provided at its free end with a hand knob 57 as shown. As is illustrated in FIG. 8, the shaft or rod 58 is of generally D-shaped configuration presenting a flattened side 58 and the opening through housing 51 is similarly shaped to provide the flattened side 60 as illustrated. The fastening member 55 is such as to allow rotational movement of the shaft or rod 56 with respect to the member 54 and with the construction as is shown in FIG. 8, the selected position of the member 54 can be achieved by slightly rotating the rod 56 by means of the hand knob 57 to wedge it or jam it within the end wall of the housing by virtue of the non-circular shapes of the rod 58 and the opening 59 in the housing 51.

As is seen best in FIGS. 5 and 6, the member 53 is provided with a stepped portion having an upstanding hook portion 63 therein whereas the side of the member 54 adjacent the member 53 is recessed to receive the latching member 65 pivotally mounted thereon by means of the pivot pin 64 and normally disposed in the position illustrated in FIG. 5 by virtue of the arm or latching means 65 resting against the stop 67 projecting laterally from the member 54. The latching means 65 also carries a laterally projecting pin 66 which is adapted to intercept the path of movement of the hook 63 on the member 53 as the throttle is moved to opening position thereby to lift the member 65 about the pivot 64 until the pin 66 drops back down past the hook 63 as is illustrated in FIG. 7 and thus captures the holding member 53. In FIG. 7, the member 54 has been shifted to a predetermined position as selected by the operator and when the parts have been operatively engaged by normal movement of the throttle by the accelerator pedal, the member 53 is then restrained from returning to allow the throttle plate to close beyond the positon established by the position of the pin 66.

To allow for automatic release of the throttle mechanism upon the attainment of a predetermined braking or deceleration force imposed upon the vehicle, the lower compartment of the housing contains a weight in the form of a ball 70. Likewise, the latching means 65 is provided with a downwardly projecting cam nose 68 which protrudes through the elongate slot 69 in the partition 52, see particularly FIGS. 5 and 6, so as to be in the path of the inertia means 70.

When sufficient braking or deceleration force is exerted upon the vehicle, the direction of movement of which is indicated by the arrow V in FIG. 5, the inertia ball 70 will exert sufficient force against the camming nose 68 to lift the lever or arm 65 such that the pin 66 is no longer in capturing position or relationship to the hook 63. This is illustrated in FIG. 7 of the drawing.

In both embodiments shown in FIGS. 1-4 and 5-8, the inertia force required to effect disengagement between the latching parts may be determined in part by the pin-engaging faces of the hook 25 and the hook 63 respectively. Thus, in both instances, it will be observed that releasing motion will require some camming action between the hooks 25, 63 and the associated pins 13 and 56 in order to effect release and, by virtue of the normal return spring mechanism associated with the throttle plate, this resists the separation of the parts to some degree. In other words, in all embodiments it is desired that mere engagement of the inertia means against the latching means be insufficient to effect release, but that release is expected only upon attainment of some predetermined deceleration force.

The embodiment of FIGS. 5-8 also contains provision for manual override by the operator. For this purpose, the housing 51 is provided with a further opening in the end wall thereof slidably to receive the rod 71 whose inner headed end is normally engaged against the plate 70. The opposite end of the shaft or rod 71 is provided with a finger knob 72 and the spring 73 normally serves to urge the rods to the right as is illustrated in FIG. 5. However, if the operator so desires, he may punch the knob 72 and thus propel the weight 70 with sufficient force to disengage the parts if he so desires and thereby override the cruise control device manually without requiring any braking action to effect the normal release thereof.

Figure 9:
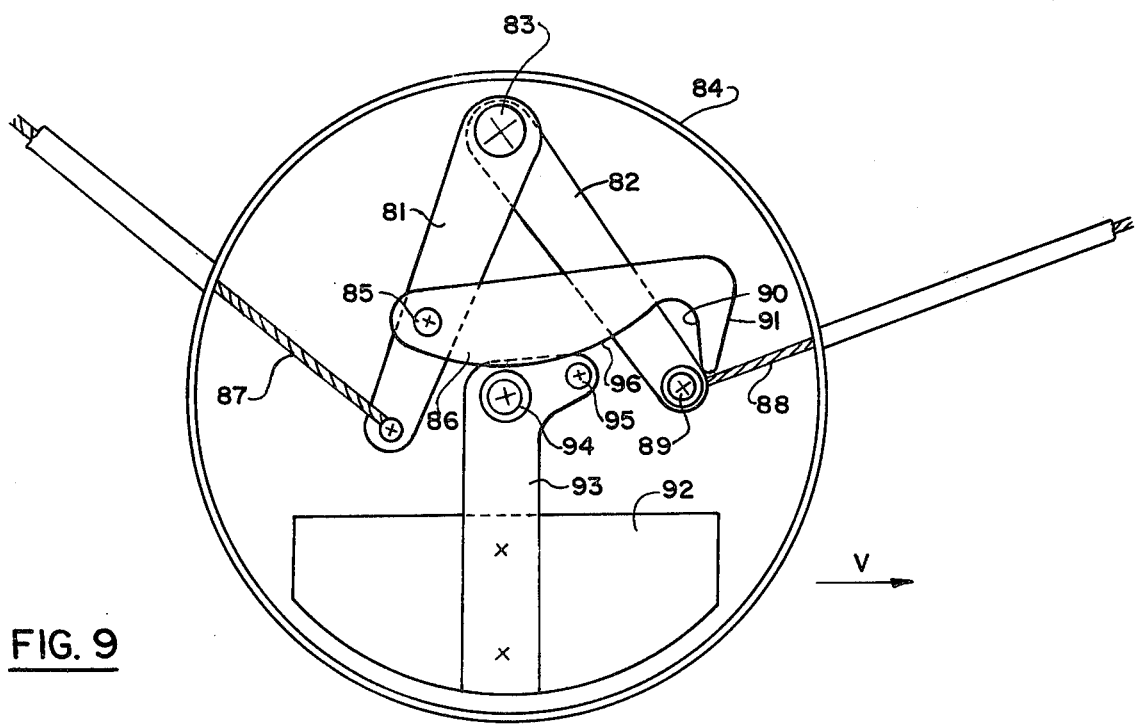
FIG. 9 is a plan view similar to FIG. 1 but illustrating a still further embodiment of the invention.

The embodiment illustrated in FIG. 9 is similar in many respects to the embodiment illustrated in FIGS. 1-4 but is of somewhat simplified construction as compared therewith. In the embodiment of FIG. 9, the housing is indicated by the reference character 84 and is formed similarly to the housing H in FIGS. 1-4. However, in this instance, the housing is disposed in an upright position in orientation identical to that as illustrated in FIG. 9. The housing carries at its uppermost portion the pivot pin 83 upon which the two arms 81 and 82 are freely pivotally mounted. In this case, the cable 87, attached to the free end of the arm 81 extends to the dashboard control mechanism whereas the cable 88 which is attached to the free end of the arm 82 extends to the throttle plate control. Centrally disposed in the housing 84 is a further pin 94 which pivotally supports an arm 93 to which the weight 92 is attached, the weight 92 and arm 93 forming in effect a pendulum which is free to swing back and forth under the action of gravity and accelerating or decelerating forces exerted on the vehicle.

The pendulum arm 93 includes a lateral projection which carries a pin 94 extending laterally therefrom and underlying the latching member 86. The latching member 86 is pivotally attached to the arm 81 by means of the pivot pin 85 and terminates in the hook end portion 91 having the camming face or surface 90 thereon as illustrated. The free end of the arm 82 is provided likewise with a laterally projecting pin 89 which is adapted to cam aside the lever 86 as the throttle is moved to the open position, consequently swinging the arm 81 and carrying the latching lever 86 with it. When the hook 91 has cleared the fixed pin 89, the lever 86 will drop back over the pin 89 and the holding member or arm 81 will thus be captured so as to restrain the mechanism for preventing the throttle from returning to the fully closed or idle position. The normal position of the lever or arm 86 is achieved by virtue of its resting on the laterally projecting pin of the pendulum device. Likewise, the automatic release of the mechanism is effected in response to swinging of the weight 92 when the vehicle is decelerated in its normal forward direction V, thereby causing the pin 95 to act against the camming surface 96 of the lever 86 and swing the lever 86 upwardly to effect the release of the hook and pin.

It will be appreciated that by virtue of the cable connections employed in the various embodiments of the invention, the devices have substantial freedom in the choice of locations at which they are installed. In the embodiments of FIGS. 1-4, the device can be located practically anywhere so long as the housing is substantially vertical and is oriented with respect to the direction of vehicle movement V as is illustrated in FIG. 1. In the embodiment of FIG. 9, the housing must be disposed vertically and in a relative orientation to the direction of vehicle movement V as is illustrated. However, there are virtually no other constraints to the mounting of these embodiments. In the embodiment of FIGS. 5-8, the only requirement is that the housing be disposed substantially horizontal and generally aligned with the direction of vehicular movement V.

What is claimed is:

1. A device for restraining the throttle plate of a vehicle engine from returning to closed condition whereby to maintain a predetermined throttle setting, which comprises in combination:

a holding member adapted to be connected to the throttle control of a vehicle engine so as to be movable back and forth along a predetermined path in response to opening and closing movements of such throttle plate;

a locking member mounted for movement along said path and means for selectively fixing said locking member along said path whereby to establish said predetermined throttle setting;

latching means on said locking member for engaging said holding member to prevent return movement of said holding member when said holding member reaches a certain position along said path as established by the fixed position of said locking member; and inertia means responsive to deceleration force acting on the associated vehicle for disengaging said latching means from said holding member to allow return movement of said holding member.

2. A device as defined in claim 1 wherein said holding and locking members are pivoted to swing back and forth along said path.

3. A device as defined in claim 1 wherein said holding and locking members are slidably mounted to reciprocate along said path.

4. A device as defined in claim 1 wherein said inertia means comprises a weight oriented to move back and forth essentially in alignment with the longitudinal axis of the associated vehicle.

5. A device as defined in claim 1 wherein said inertia means comprises a weight, a vertical shaft eccentrically connected to said weight, and mounting means for allowing limited tilting of said shaft whereby said weight seeks an inoperative position in the absence of deceleration force acting on the associated vehicle.

6. A device as defined in claim 1 wherein said latching means comprises an arm pivotally carried by said locking member and a cam member fixed to said arm and disposed in the path of movement of said inertia means, said arm being pivoted about an axis which allows the arm to swing into disengaging position when said cam member is cammed aside by said inertia means.

7. A device as defined in claim 6 wherein said latching means further comprises a first finger on said arm and said holding member includes a second finger, said first finger being engageable with said second finger to swing aside and pass said second finger as the holding member is moved in throttle-opening direction and thereafter to swing back into blocking relation to said second finger to establish said predetermined throttle setting via the holding member.

8. A device for restraining the throttle plate of a vehicle engine from returning from an open condition to a closed condition whereby to maintain a predetermined throttle setting, which comprises in combination:

a Bowden cable adapted for connection at one end to the throttle control of a vehicle engine and a holding member connected to the other end of the cable whereby said holding member moves in concert with movement of the throttle plate;

locking means disposed in a selected position in the path of movement of said holding member for capturing same after the holding member has moved past a predetermined position in the opening direction of the associated throttle plate and preventing return motion of said holding member beyond said predetermined position;

means for adjusting the selected position of said locking means whereby said capturing takes place at a selected throttle plate position; and inertia means for disengaging said locking means from said holding member in response to a predetermined decelerating force acting upon the associated vehicle.

9. A device as defined in claim 8 including a housing containing said holding member and said locking means.

10. A device as defined in claim 9 wherein said housing also contains said inertia means.

11. A device as defined in claim 10 wherein said inertia means is in the form of a pendulum pivoted about a horizontal axis.

12. A device as defined in claim 10 wherein said inertia means is in the form of a weight movable longitudinally within said housing.

13. A device as defined in claim 9 wherein said inertia means is in the form of an eccentric mass, said housing having a vertical shaft projecting therefrom and mounting said eccentric mass.

14. A device for restraining the throttle plate of a vehicle engine from returning to closed position whereby to establish and maintain a predetermined throttle setting, comprising in combination:

holder means adapted to be connected at one end thereof to the throttle plate mechanism of an associated vehicle for forward and return movements in concert respectively with throttle opening and closing movements as imparted to the throttle plate by conventional accelerator pedal controls;

operator controlled locking means selectively positioned in the path of movement of said holder means for preventing return movement of said holder means beyond a predetermined point; and inertia means responsive to deceleration force for disengaging said locking means from said holder means to allow said holder means to return beyond said point.

15. A device for restraining the throttle plate of a vehicle engine from returning from an open condition to a closed condition whereby to maintain a predetermined throttle setting, which comprises in combination:

a holding member adapted to be connected to the throttle control of a vehicle engine so as to be movable in response to opening and closing movements of said throttle plate;

a movable locking member and means for selectively fixing the position of said locking member to establish said predetermined throttle setting;

latching means on said locking member for engaging said holding member to prevent return movement of said holding member when said holding member reaches a certain position as established by the fixed position of said locking member; and inertia means responsive to deceleration force acting on the associated vehicle for disengaging said latching means from said holding member to allow return movement of said holding member.

* * * * *